(12) United States Patent
Ko et al.

(10) Patent No.: US 9,641,309 B2
(45) Date of Patent: May 2, 2017

(54) METHOD FOR TRANSCEIVING SIGNAL IN WIRELESS COMMUNICATION SYSTEM, AND APPARATUS THEREFOR

(71) Applicant: LG Electronics Inc., Seoul (KR)

(72) Inventors: Hyunsoo Ko, Seoul (KR); Jinmin Kim, Seoul (KR); Jaehoon Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 41 days.

(21) Appl. No.: 14/443,874

(22) PCT Filed: Dec. 2, 2013

(86) PCT No.: PCT/KR2013/011053
§ 371 (c)(1),
(2) Date: May 19, 2015

(87) PCT Pub. No.: WO2014/092365
PCT Pub. Date: Jun. 19, 2014

(65) Prior Publication Data
US 2015/0280887 A1  Oct. 1, 2015

Related U.S. Application Data

(60) Provisional application No. 61/735,964, filed on Dec. 11, 2012, provisional application No. 61/825,527, filed on May 21, 2013.

(51) Int. Cl.
*H04L 5/14* (2006.01)
*H04L 5/00* (2006.01)
(Continued)

(52) U.S. Cl.
CPC ......... *H04L 5/0073* (2013.01); *H04B 1/1027* (2013.01); *H04B 1/525* (2013.01);
(Continued)

(58) Field of Classification Search
None
See application file for complete search history.

(56) References Cited

U.S. PATENT DOCUMENTS 8,301,104 B1  10/2012  Gupta et al.
2008/0107046 A1  5/2008  Kangasmaa et al.
(Continued)

FOREIGN PATENT DOCUMENTS

KR  20120095577 A  8/2012

OTHER PUBLICATIONS

Lingfan Weng et al., "Multi-user MIMO relay system with self-interference cancellation", WCNC 2007, Mar. 15, 2007, pp. 958-962.

*Primary Examiner* — Anh-Vu Ly
(74) *Attorney, Agent, or Firm* — Dentons US LLP

(57) ABSTRACT

The present invention relates to a method for transceiving a signal in a wireless communication system. A method for transceiving a signal in a wireless communication system according to one embodiment of the present invention comprises the steps of: transmitting a downlink signal from a base station to a terminal; receiving an uplink signal transmitted from the terminal; and cancelling a self-interference signal on the basis of the transceived downlink signal or the uplink signal, wherein the transmission periods for the downlink signal and the uplink signal comprise dedicated transmission periods, and in the dedicated transmission period, signal transmission periods of the base station and the terminal are differentiated.

15 Claims, 18 Drawing Sheets

(51) Int. Cl.
*H04B 7/0452* (2017.01)
*H04B 7/26* (2006.01)
*H04B 1/10* (2006.01)
*H04B 1/525* (2015.01)
*H04J 11/00* (2006.01)
*H04W 56/00* (2009.01)
*H04L 5/16* (2006.01)

(52) U.S. Cl.
CPC ......... *H04B 7/0452* (2013.01); *H04B 7/2621* (2013.01); *H04J 11/0056* (2013.01); *H04L 5/0048* (2013.01); *H04L 5/0062* (2013.01); *H04L 5/16* (2013.01); *H04W 56/001* (2013.01); *H04J 2011/0096* (2013.01); *H04L 5/0035* (2013.01)

(56) References Cited

U.S. PATENT DOCUMENTS

| | | | |
|---|---|---|---|
| 2009/0213765 A1 | 8/2009 | Rinne et al. | |
| 2011/0110252 A1 | 5/2011 | Panah et al. | |
| 2011/0143655 A1 | 6/2011 | Ahn et al. | |
| 2011/0319119 A1 | 12/2011 | Ishii | |
| 2012/0063369 A1 | 3/2012 | Lin et al. | |
| 2012/0147790 A1* | 6/2012 | Khojastepour | H01Q 3/2605 370/277 |
| 2012/0155336 A1 | 6/2012 | Khojastepour et al. | |
| 2012/0201153 A1 | 8/2012 | Bharadia et al. | |
| 2012/0201173 A1* | 8/2012 | Jain | H04B 1/525 370/277 |
| 2012/0294224 A1 | 11/2012 | Silva et al. | |
| 2013/0089009 A1* | 4/2013 | Li | H04L 27/2601 370/278 |
| 2013/0114468 A1* | 5/2013 | Hui | H01Q 3/2611 370/277 |
| 2013/0155912 A1* | 6/2013 | Khojastepour | H04W 72/0413 370/277 |
| 2013/0194984 A1* | 8/2013 | Cheng | H04W 72/082 370/294 |
| 2013/0286903 A1* | 10/2013 | Khojastepour | H04L 5/14 370/280 |
| 2013/0301484 A1* | 11/2013 | Khandani | H04W 16/14 370/277 |
| 2015/0229461 A1* | 8/2015 | DiFazio | H04L 5/14 370/280 |
| 2015/0326269 A1* | 11/2015 | Ko | H04B 1/525 375/219 |

* cited by examiner

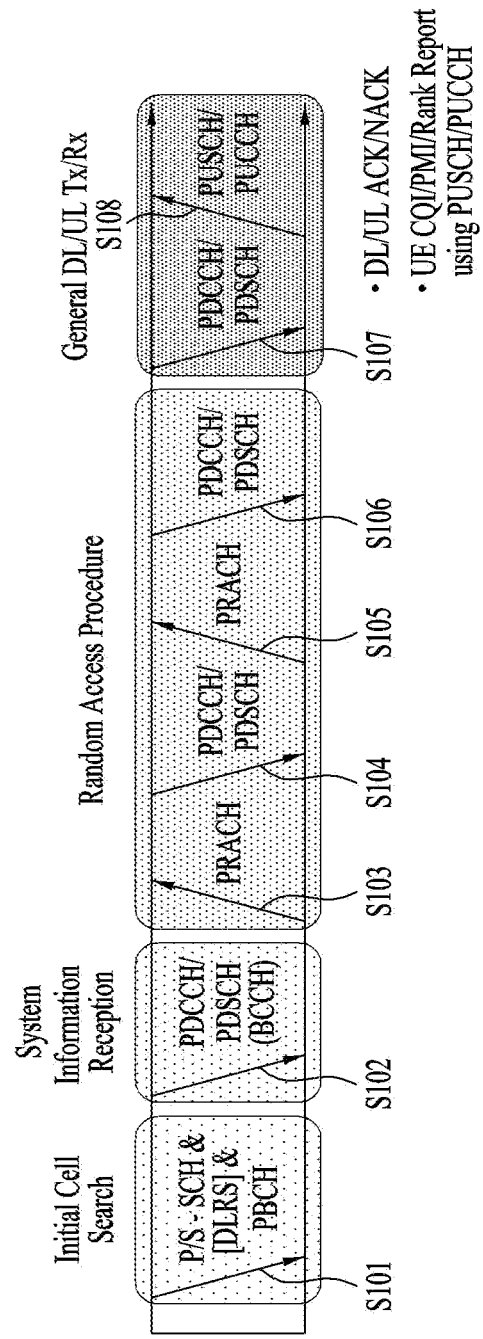

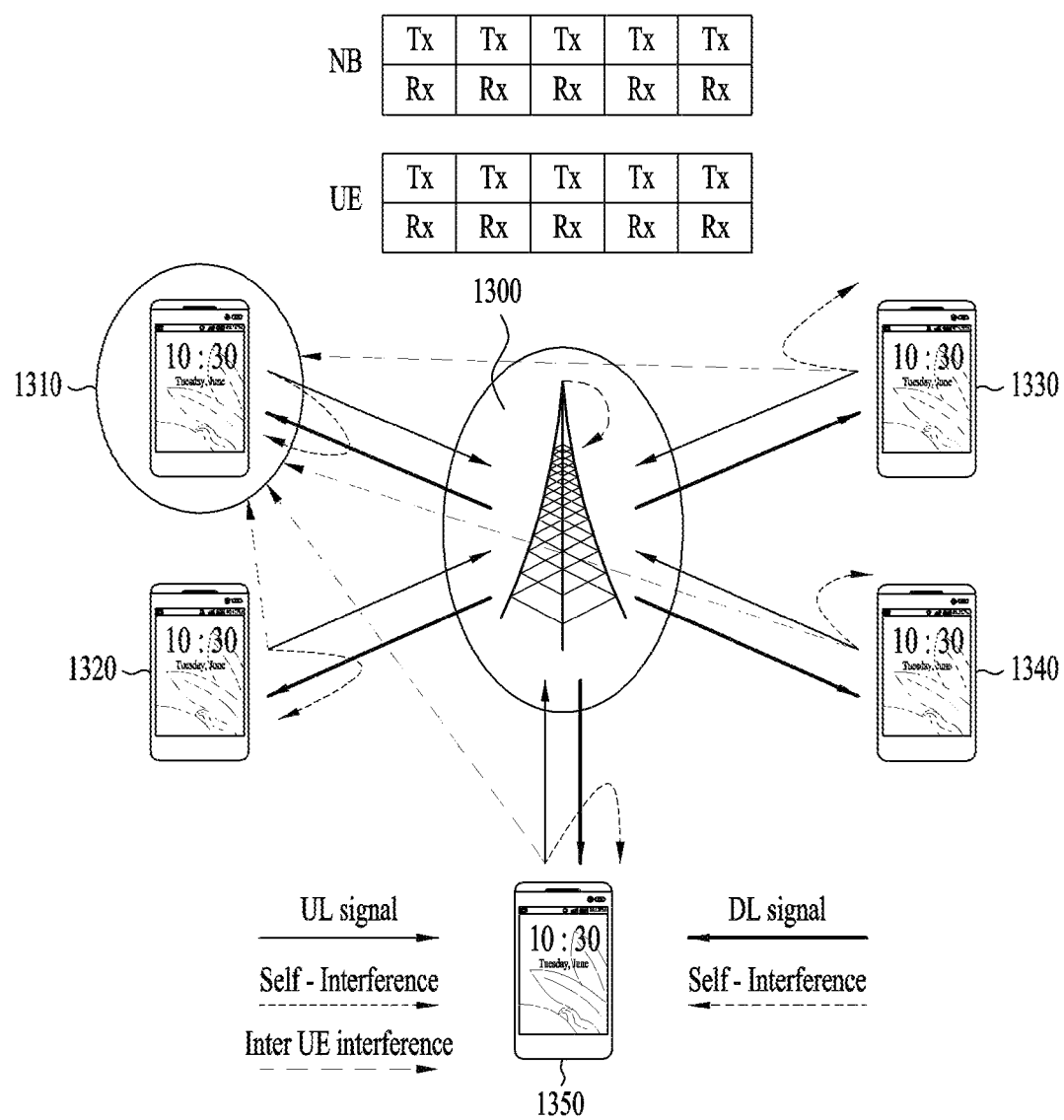

METHOD FOR TRANSCEIVING SIGNAL IN WIRELESS COMMUNICATION SYSTEM, AND APPARATUS THEREFOR

This application is a 35 USC §371 National Stage entry of International Application No. PCT/KR2013/011053 filed on Dec. 2, 2013, and claims priority to U.S. Provisional Application No. 61/735,964 filed on Dec. 11, 2012 and 61/825,527 filed on May 21, 2013, all of which are hereby incorporated by reference in their entireties as if fully set forth herein.

TECHNICAL FIELD

The present invention relates to a wireless communication system. In particular, the present invention relates to a method of transceiving a signal in a time division multiplexing cell cooperative communication system and an apparatus therefor. In more particular, the present invention relates to a method of reducing signal interference by filtering a transceived signal and an apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

According to a related art, one transmission antenna and one reception antenna (single input single output (SISO)) are used. On the contrary, MIMO (multiple input multiple output) corresponds to a method of using a plurality of transmission antennas and a plurality of reception antennas. Transmission and reception efficiency of data can be enhanced by the method. In particular, if a transmitting end or a receiving end of a wireless communication system uses a plurality of antennas, capacity can be increased and performance can be improved. In the following description, MIMO can also be called multiple antennas.

In the multiple antenna technology, it may not depend on a single antenna path to receive a whole message. Data is completed by combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

In a configuration of a general MIMO communication system, $N_T$ number of transmitting antenna is installed in a transmitting end and $N_R$ number of receiving antenna is installed in a receiving end. In case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$.

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a next generation wireless LAN and the like.

A multi antenna system uses a plurality of transmitting antennas and a plurality of receiving antennas and may be able to overcome a fading impact occurring on a radio channel via a plurality of transmitting and receiving paths. Hence, data transmission speed and data transmission quality can be enhanced compared to a single antenna. Yet, in order to obtain high transmission speed in MIMO system, it is necessary to have a sufficient distance between antennas. Since a base station receives a signal using a wide coverage, it is able to install antennas including a sufficient distance between base stations. Yet, it is practically difficult for a miniaturized terminal to have a sufficient distance. Hence, multi-user MIMO (MU-MIMO) enabling communication between many terminals including a single antenna and a base station of multiple antennas is widely studying and the MU-MIMO is included in 3GPP standard such as LTE-advanced and the like.

In multi-cell environment, transmission speed and quality of a user positioned at a boundary of a cell is seriously deteriorated by inter-cell interference (ICI) caused by a neighboring cell. In order to overcome the ICI, it may be able to use a frequency reuse method corresponding to a method of reducing interference by allocating an orthogonal frequency resource between adjacent cells. Yet, the frequency reuse method may bring not only improvement of transmission speed and quality of a user positioned at a cell boundary but also degradation of transmission speed and quality of a whole network. In order to solve the aforementioned problem, as a method of reducing the ICI by efficiently utilizing a frequency resource, there exists a CoMP (coordinated multi-point) scheme corresponding to a scheme of reducing the ICI via coordination between multiple cells. The CoMP scheme forms a virtual MIMO system by exchanging channel information or data information of a user with each other between multiple cells.

In order to efficiently transceive data in MU-MIMO system, it is necessary to have channel information between antennas. In a time division cellular system, a base station allocates a pilot resource to a user equipment to obtain the channel information. The user equipment transmits a predetermined pilot sequence to the base station via the allocated pilot resource and the base station estimates channel information by receiving the pilot sequence from the user equipment. Although a demand of the pilot resource increases in proportion to the number of user equipment, an amount of the pilot resource is limitative. Hence, it is practically impossible to allocate the pilot resource orthogonal between multiple cells to all user equipments. Hence, it is difficult to perfectly estimate a channel of a user by using a pilot resource and a transmission and reception filter constructed by an estimated channel may cause unintended interference. Performance degradation caused by reusing a pilot resource is especially serious in a cooperative cellular environment.

Hence, in order to obtain high transmission speed and quality by suppressing interference in a multi cell cooperative communication system, it is mandatory to control interference caused by a pilot resource. In other word, a base station should allocate an optimized pilot resource to each user equipment, estimate a channel between user equipments using a given pilot resource and design a transmission and reception filter based on the estimated channel. In order to maximize transmission speed, it is important to design an optimized scheme between the aforementioned steps. Hence, it is required to have a method of designing an enhanced transmission and reception filter capable of cancelling inter-cell interference and/or inter-user equipment interference from an estimated channel.

DISCLOSURE

Technical Problem

One object of the present invention is to provide a method of transmitting and receiving a signal in a wireless communication system and an apparatus therefor. Another object of the present invention is to provide a method of reducing signal interference in a multi-user MIMO (MU-MIMO) system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

The object of the present invention can be achieved by providing a method for transmitting and receiving a signal by a base station in a wireless communication system, the method including transmitting a downlink signal from the base station to a user equipment, receiving an uplink signal transmitted from the user equipment, and cancelling a self-interference signal based on the downlink signal or the uplink signal, wherein a transmission time interval for the downlink signal and uplink signal includes a dedicated transmission time interval, wherein a signal transmission time interval for the base station and a signal transmission time interval are distinguished from each other in the dedicated transmission time interval.

Preferably, the transmitting and receiving of the signals may be performed simultaneously after the dedicated transmission time interval.

Preferably, transmitting the downlink signal may be performed in the dedicated transmission time interval.

Preferably, the method may further include receiving, by the base station, the downlink signal of the base station transmitted in the dedicated transmission time interval.

Preferably, receiving the uplink signal may be performed in the dedicated transmission time interval.

Preferably, the method may further include receiving, by the user equipment, the uplink signal transmitted by the user equipment in the dedicated transmission time interval.

Preferably, the method may further include receiving, by the user equipment, an uplink signal of another user equipment transmitted in the dedicated transmission time interval.

Preferably, transmission of the uplink signal and the downlink signal may be performed in the same frequency band.

Preferably, a subframe involved in transmitting the downlink signal from the base station to the user equipment may include at least one of physical broadcast channel (PBCH), primary synchronization signal/secondary synchronization signal (PSS/SSS), reference signal and data channel information.

Preferably, a subframe involved in transmitting the uplink signal from the user equipment to the base station may include at least one of physical random access channel (PRACH), sounding reference signal (SRS), physical uplink control channel (PUCCH) and physical uplink shared channel (PUSCH) information.

Preferably, the self-interference signal may be the downlink signal received by the base station after being transmitted from the base station.

Preferably, the method may further include acquiring downlink synchronization information based on the downlink signal or the uplink signal.

In another aspect of the present invention, provided herein is a method for transmitting and receiving a signal by a base station in a wireless communication system, the method including transmitting a downlink signal from the base station to a user equipment, receiving uplink signals transmitted from a plurality of user equipments, and cancelling a self-interference signal based on the downlink signal or the uplink signals, wherein, when a first user equipment of the plurality of user equipments transmits an uplink signal in a time interval, none of the other user equipments of the plurality of user equipments transmits an uplink signal in the time interval.

Preferably, the uplink signal transmitted by the first user equipment may be received by at least one of the other user equipments of the plurality of user equipments.

Preferably, the base station may perform the transmitting and the receiving in the time interval.

In another aspect of the present invention, provided herein is a base station for transmitting and receiving a signal in a wireless communication system, including a transceiver, and a processor, wherein the processor is configured to transmits a downlink signal to a user equipment using the transceiver, to receive an uplink signal transmitted from the user equipment, and to cancel a self-interference signal based on the downlink signal or the uplink signal, wherein a transmission time interval for the downlink signal and uplink signal comprises a dedicated transmission time interval, wherein the dedicated transmission time interval is divided into a signal transmission time interval for the base station and a signal transmission time interval for the user equipment.

Advantageous Effects

According to the present invention, it is able to efficiently transmit and receive a reference signal and a data signal in a wireless communication system. In particular, it is able to reduce inter-cell interference by filtering a transceived signal.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 1 is a diagram for explaining physical channels used for 3GPP LTE system and a general signal transmission method using the physical channels;

FIG. 13 is a diagram for a form of interference between a base station and a user equipment;

MODE FOR INVENTION

Figure 2A:
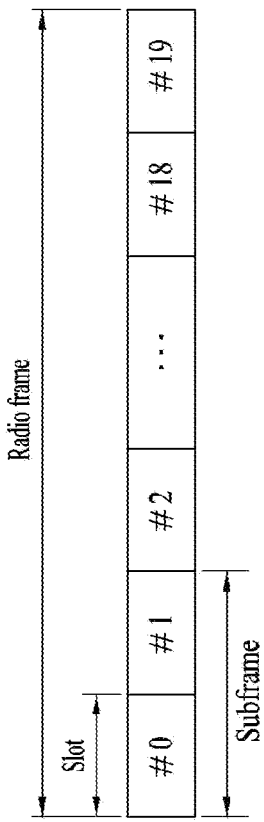
FIGS. 2(a) and 2(b) are diagrams for an example of a radio frame structure.

The following description of embodiments of the present invention may apply to various wireless access systems including CDMA (code division multiple access), FDMA (frequency division multiple access), TDMA (time division multiple access), orthogonal frequency division multiple access (OFDMA), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

In a wireless communication system, a user equipment receives information from a base station in downlink (hereinafter abbreviated DL) and transmits information to the base station in uplink (hereinafter abbreviated UL). The information transceived between the user equipment and the base station includes data and various control information. There exist various physical channels according to a type/usage of the information transceived between the user equipment and the base station.

FIG. 1 is a diagram for explaining an example of physical channels used for 3GPP LTE system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like. Subsequently, the user equipment may receive a physical broadcast channel (PBCH) from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the base station [S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

FIG. 2 is a diagram for explaining an example of a structure of a radio frame. Referring to FIG. 2, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2(a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

Figure 2B:
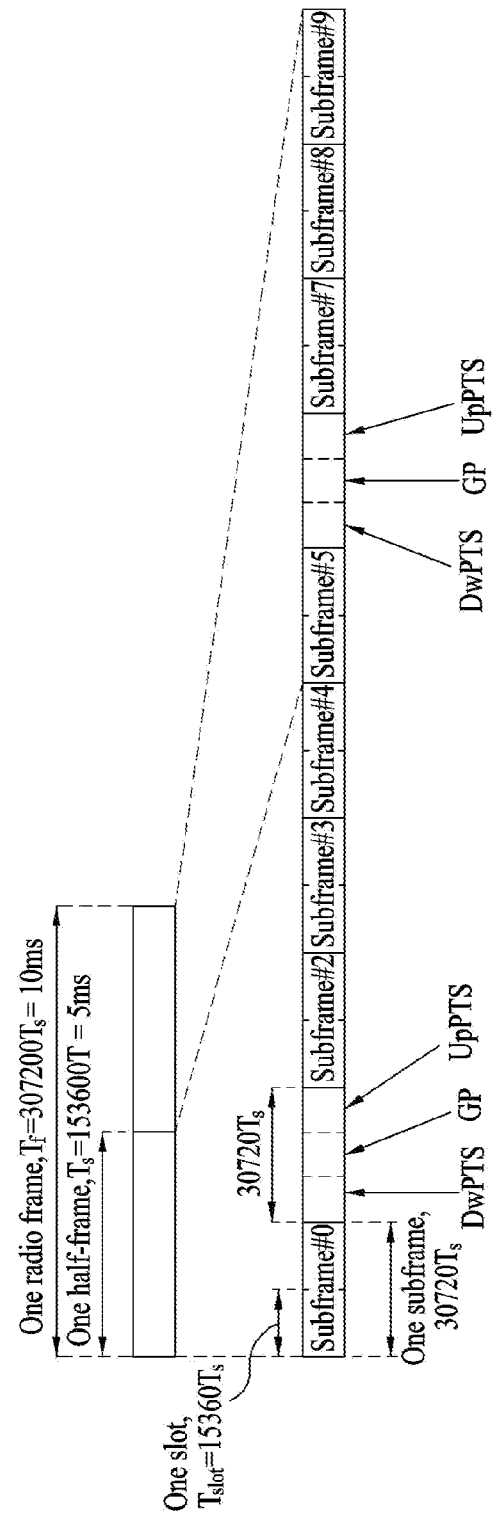

FIG. 2(b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
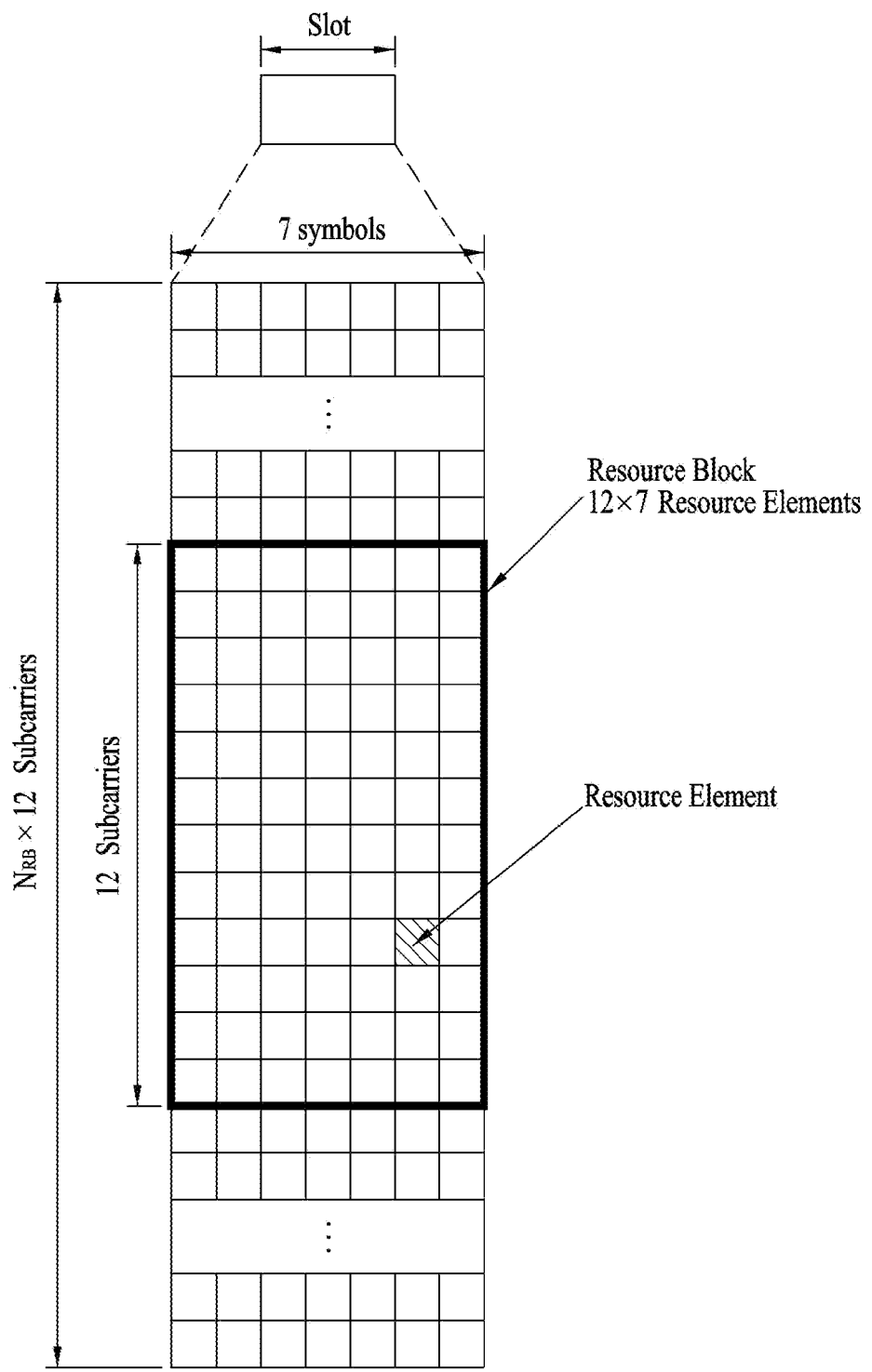
FIG. 3 is a diagram for an example of a resource grid for a downlink slot.

FIG. 3 is a diagram for one example of a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12 7(6) resource elements. The number NRB of resource blocks included in a DL slot may depend on a DL transmission bandwidth. And, the structure of an uplink (UL) slot may be identical to that of the DL slot and OFDM symbol is replaced by SC-FDMA symbol.

Figure 4:
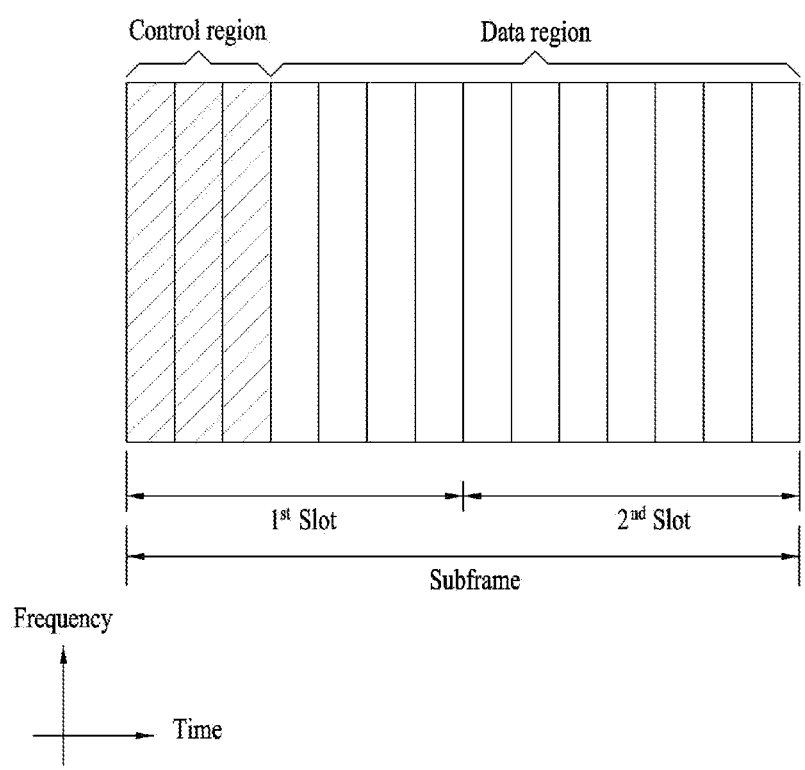
FIG. 4 is a diagram for an example of a structure of a downlink subframe.

FIG. 4 is a diagram for an example of a structure of a downlink subframe.

Referring to FIG. 4, maximum 3(4) OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of control channels within the subframe. The PHICH is a response channel in response to UL transmission and carries HARQ ACK/NACK (hybrid automatic repeat request acknowledgement/negative-acknowledgement) signals.

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

PDCCH carries a transmission format and resource allocation information of DL-SCH (downlink shared channel), a transmission format and resource allocation information of UL-SCH (uplink shared channel), paging information on a PCH (paging channel), system information on a DL-SCH, resource allocation information of an upper layer control message such as a random access response transmitted on PDSCH, a transmit (Tx) power control command set for an individual user equipments within a user equipment (UE) group, a transmit (Tx) power control command, information on activation indication of VoIP (voice over IP), and the like.

A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined according to the number of CCEs. A base station determines a PDCCH format in accordance with DCI to be transmitted to a user equipment and attaches a CRC (cyclic redundancy check) to control information. The CRC is masked with a unique identifier (e.g., RNTI (radio network temporary identifier)) in accordance with an owner or usage of PDCCH. If PDCCH is provided for a specific user equipment, the CRC can be masked with a unique identifier of the corresponding user equipment, i.e., C-RNTI (i.e., Cell-RNTI). If PDCCH is provided for a paging message, the CRC can be masked with a paging identifier (e.g., P-RNTI (Paging-RNTI)). If PDCCH is provided for system information, and more particularly, for a system information block (SIB), the CRC can be masked with a system information identifier (e.g., SI-RNTI (system information-RNTI). If PDCCH is provided for a random access response, the CRC can be masked with RA-RNTI (random access-RNTI).

Figure 5:
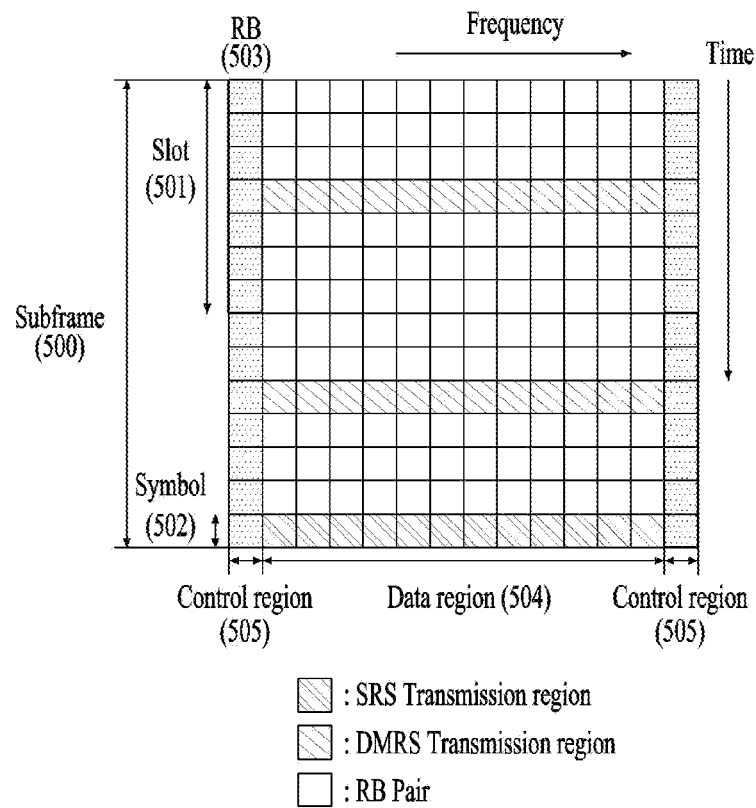
FIG. 5 is a diagram for an example of a structure of an uplink.

FIG. 5 is a diagram for an example of a structure of an uplink subframe.

Referring to FIG. 5, a subframe 500 of 1 ms-length, which is a basic unit of UL transmission in LTE, includes two 0.5 ms-length slots. In case of a normal CP (cyclic prefix), each slot includes 7 symbols 502 and one symbol corresponds to one SC-FDMA symbol. A resource block (RB) 503 is a resource allocation unit corresponding to 12 subcarriers in frequency domain and a slot in time domain, respectively. In LTE system, a structure of an UL subframe is mainly divided into a data region 504 and a control region 505. The data region includes PUSCH and is used for transmitting a data signal such as audio and the like. The control region includes PUCCH and is used for transmitting uplink control information (UCI). PUCCH includes an RB pair located at both ends of the data region on a frequency axis and hops on a slot boundary.

The PUCCH can be used for transmitting following control information.

SR (scheduling request): information used for making a request for an uplink UL-SCH resource. This information is transmitted using an OOK (on-off keying) scheme.

HARQ-ACK: a response signal for a downlink data packet (e.g., a codeword) on PDSCH. This information indicates whether the downlink data packet is successfully received. HARQ ACK 1 bit is transmitted in response to a single downlink codeword (CW) and HARQ ACK 2 bits are transmitted in response to two downlink codewords.

CSI (channel state information): feedback information on a downlink channel. MIMO (multiple input multiple output)-related feedback information includes an RI (rank indicator) and a PMI (precoding matrix indicator). 20 bits per subframe are used for this information.

An amount of control information capable of being transmitted by a UE in a subframe depends on the number of SC-FDMA symbol available for transmitting the control information. The SC-FDMA available for transmitting the control information means a remaining SC-FDMA symbol except an SC-FDMA symbol used for transmitting a reference signal (RS) in a subframe. In case of a subframe to which an sounding reference signal (SRS) is configured thereto, a last SC-FDMA symbol of the subframe is excluded as well. A reference signal is used to detect coherent of PUCCH. PUCCH supports various formats depending on transmitted information.

Table 1 indicates a mapping relation between a PUCCH format and a UCI in LTE.

TABLE 1

| PUCCH format | UL control information (UCI) |
|---|---|
| Format 1 | SR (scheduling request) (un-modulated wave) |
| Format 1a | 1-bit HARQ ACK/NACK (SR existence/non-existence) |
| Format 1b | 2-bit HARQ ACK/NACK (SR existence/non-existence) |
| Format 2 | CSI (20 coded bits) |
| Format 2 | CSI and 1- or 2-bit HARQ ACK/NACK (20 bits) (only applied to extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | Maximum 24 bits HARQ ACK/NACK + SR |

A sounding reference signal (SRS) is transmitted via an SC-FDMA symbol which is positioned at the end of a subframe in a time axis. SRSs of a plurality of user equipments transmitted via the last SC-FDMA of an identical subframe can be distinguished from each other according to a position/sequence of a frequency.

In a legacy LTE, an SRS is periodically transmitted. Periodic transmission of an SRS is configured by a cell-specific SRS parameter and a UE-specific SRS parameter. The cell-specific SRS parameter (i.e., cell-specific SRS configuration) and the UE-specific SRS parameter (i.e., UE-specific SRS configuration) are transmitted to a UE via upper layer (e.g., RRC) signaling. Similarly, in case of a relay system, an SRS configuration for a relay is configured by a cell-specific SRS parameter and a relay-specific (RN-specific) SRS parameter.

The cell-specific SRS parameter includes srs-BandwidthConfig and srs-SubframeConfig. The srs-BandwidthConfig indicates information on a frequency band in which an SRS is transmittable and the srs-SubframeConfig indicates information on a subframe in which an SRS is transmittable. In a cell, a subframe in which an SRS is transmittable is periodically configured in a frame. Table 2 in the following shows the srs-SubframeConfig among the cell-specific SRS parameters.

TABLE 2

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |

TABLE 2-continued

| srs-SubframeConfig | Binary | Configuration Period $T_{SFC}$ (subframes) | Transmission offset $\Delta_{SFC}$ (subframes) |
|---|---|---|---|
| 14 | 1110 | 10 | {0, 1, 2, 3, 4, 5, 6, 8} |
| 15 | 1111 | reserved | Reserved |

$T_{SFC}$ indicates a cell-specific subframe configuration and $\Delta_{SFC}$ indicates a cell-specific subframe offset. The srs-SubframeConfig is provided by an upper layer (e.g., RRC layer). An SRS is transmitted via a subframe satisfying $\lfloor n_s/2 \rfloor \mod T_{SFC} \in \Delta_{SFC}$. In this case, $n_s$ indicates a slot index. $\lfloor \ \rfloor$ indicates a flooring function and mod indicates a modulo calculation.

The UE-specific SRS parameter includes srs-Bandwidth, srs-HoppingBandwidth, freqDomainPosition, srs-ConfigIndex, transmissionComb, and cyclicShift. The srs-Bandwidth indicates a value used for configuring a frequency band on which an SRS is transmitted by a corresponding UE. The srs-HoppingBandwidth indicates a value used for configuring frequency hopping of an SRS. The freqDomainPosition indicates a value used for determining a frequency position on which an SRS is transmitted. The srs-ConfigIndex indicates a value used for configuring a subframe in which an SRS is transmitted by a UE. The transmissionComb indicates a value used for configuring an SRS transmission comb. The cyclicShift indicates a value used for configuring a cyclic shift value applied to an SRS sequence.

Table 3 and table 4 show an SRS transmission period according to the srs-ConfigIndex and a subframe offset. The SRS transmission period indicates a time interval (unit, subframe or ms) of a UE periodically transmitting an SRS. Table 3 shows a FDD case and Table 4 shows a TDD case. An SRS configuration index (ISRS) is signaled according to a UE and each UE checks an SRS transmission period ($T_{SRS}$) and an SRS subframe offset ($T_{offset}$).

TABLE 3

| SRS Configuration Index ISRS | SRS Periodicity $T_{SRS}$ (ms) | SRS Subframe Offset $T_{offset}$ |
|---|---|---|
| 0-1 | 2 | ISRS |
| 2-6 | 5 | ISRS-2 |
| 7-16 | 10 | ISRS-7 |
| 17-36 | 20 | ISRS-17 |
| 37-76 | 40 | ISRS-37 |
| 77-156 | 80 | ISRS-77 |
| 157-316 | 160 | ISRS-157 |
| 317-636 | 320 | ISRS-317 |
| 637-1023 | reserved | reserved |

TABLE 4

| Configuration Index ISRS | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |

TABLE 4-continued

| Configuration Index ISRS | SRS Periodicity $T_{SRS}$ (ms) | SRS Subframe Offset $T_{offset}$ |
|---|---|---|
| 8 | 2 | 2, 4 |
| 9 | 2 | 3, 4 |
| 10-14 | 5 | ISRS-10 |
| 15-24 | 10 | ISRS-15 |
| 25-44 | 20 | ISRS-25 |
| 45-84 | 40 | ISRS-45 |
| 85-164 | 80 | ISRS-85 |
| 165-324 | 160 | ISRS-165 |
| 325-644 | 320 | ISRS-325 |
| 645-1023 | reserved | reserved |

In summary, in legacy LTE, the cell-specific SRS parameter informs a UE of subframes occupied to transmit an SRS in a cell and the UE-specific SRS parameter informs the UE of a subframe to be actually used by the UE among the subframes occupied to transmit an SRS. The UE periodically transmits an SRS via a specific symbol (e.g., last symbol) of a subframe designated as the UE-specific SRS parameter.

Meanwhile, in order to protect SRS transmission in a subframe occupied by the cell-specific SRS parameter, it is necessary for the UE not to transmit a UL signal via the last symbol of the subframe irrespective of whether an SRS is actually transmitted in the subframe.

In this disclosure, embodiments of the present invention are described centering on the data transmission/reception relations between a base station and a terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. And, 'terminal' may be substituted with such a terminology as a user equipment (UE), a mobile station (MS), a mobile subscriber station (MSS), and the like. And, in the following description of the present invention, a reference signal may be substituted with such a terminology as a pilot signal, a pilot resource, a pilot sequence and the like.

Full-Duplex Wireless Communication (Full Duplex Radio Transmission (FDR)

Figure 6:
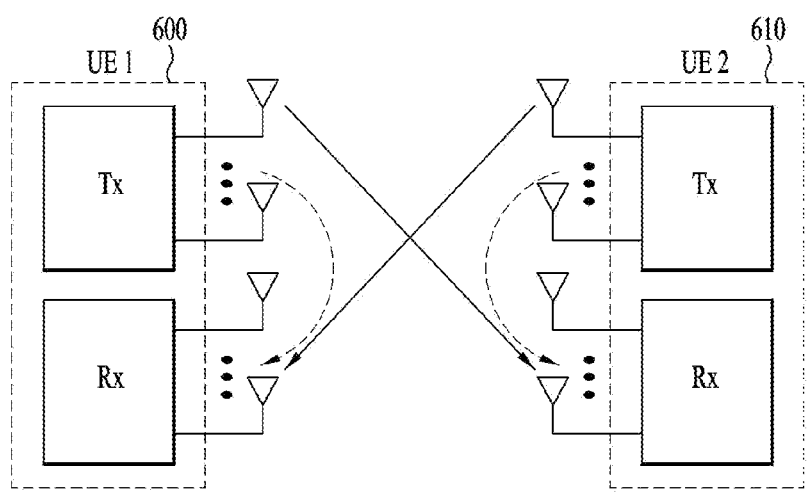
FIG. 6 is a conceptual diagram for a self-interference signal.

FIG. 6 is a conceptual diagram for a self-interference signal.

In general, full-duplex refers to a technology of a transmitting end/receiving end supporting a base station or a user equipment (UE) to transmit UL/DL without duplexing the UL/DL into frequency, time or the like. In particular, as shown in FIG. 6, since a UE 1 and a UE 2 communicate with each other in UL/DL using an identical frequency/time resource, each UE should receive a signal transmitted from a different base station or a UE while transmitting a signal. Hence, like dotted lines in FIG. 6, since a signal transmitted by a UE is directly received by a reception antenna of the UE, basic communication environment capable of causing a self-interference is formed.

In case of considering multi-cell arrangement environment, new interference or increasing interference anticipated by the introduction of FDR can be summarized as follows.

Self-user interference
Multi-user interference
Inter BS (or eNB) interference

Figure 7:
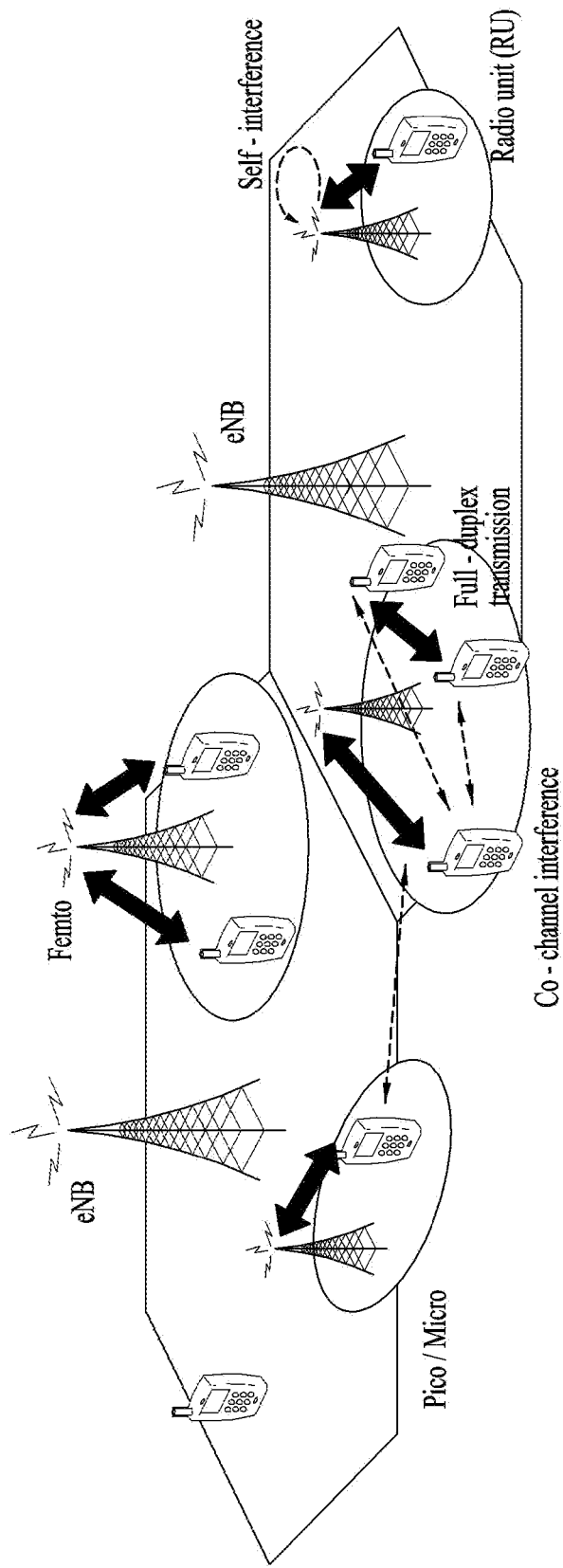
FIG. 7 is a conceptual diagram for interference in FDR.

FIG. 7 is a conceptual diagram for interference in FDR.

As shown in FIG. 6, self-user interference indicates that a transmission signal of its own directly causes interference to a reception antenna. In general, since the self-user interference is received about 60-90 dB stronger than a desired signal, it is important to completely cancel the self-user interference via an interference cancellation process.

As shown in FIG. 7, multi-user interference indicates interference occurring between a plurality of terminals. Since a legacy communication system implements half-duplex (e.g., TDD, TDD) configured to divide each of DL and UL into frequency, time and the like, interference does not occur between DL and UL. Yet, in case of a full-duplex transmission system, since UL and DL share an identical frequency/time resource with each other, as shown in FIG. 2, interference always occurs between a base station transmitting data and adjacent terminals.

Lastly, inter BS interference indicates interference occurring between base stations. The inter BS interference indicates a communication situation identical to multi-user interference and means that interference always occurs between base stations due to UL/DL resource sharing. In particular, although FDR is able to increase frequency efficiency by sharing an identical time/frequency resource in DL/UL, enhancing the frequency efficiency can be restricted by the increase of the interference.

Figure 8:
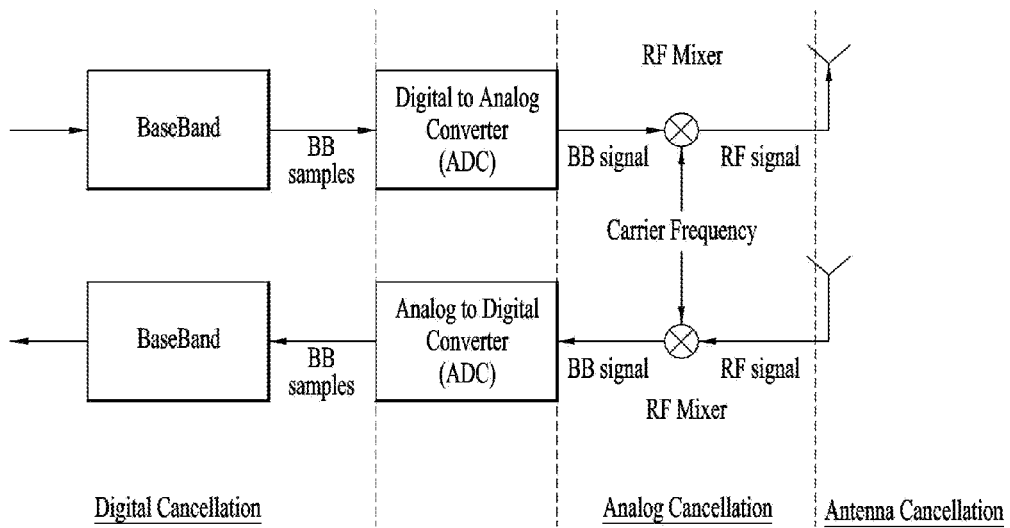
FIG. 8 is a diagram for an interference cancellation area of a FDR transmitting and receiving end.

FIG. 8 is a diagram for an interference cancellation area of a FDR transmitting and receiving end.

Self-Interference Cancellation

As mentioned in the foregoing description, self-interference generally corresponds to interference occurring in a manner that a transmission signal of a UE is directly received by a reception antenna of the UE. In this case, a size of the interference may be bigger than a size of an actual reception signal (desired signal) as much as about 60 to 90 dB. The self-interference can be cancelled by 3 schemes. A maximum interference cancellation range according to each scheme is as follows.

Scheme 1) antenna cancellation: 20 to 30 dB
Scheme 2) analog cancellation: Max, 45 dB
Scheme 3) digital cancellation: 20 to 25 dB A position to which each scheme is applied is shown in FIG. 8. In particular, digital cancellation is applied before signals processed by a base band are passing through a digital-analog converter (DAC) or after passing through an analog-digital converter (ADC). According to the digital cancellation scheme, self-interference cancellation (SIC) can be performed by applying various digital cancellation schemes such as beamforming and the like. A range of the digital cancellation becomes about 20 to 25 dB.

Figure 9:
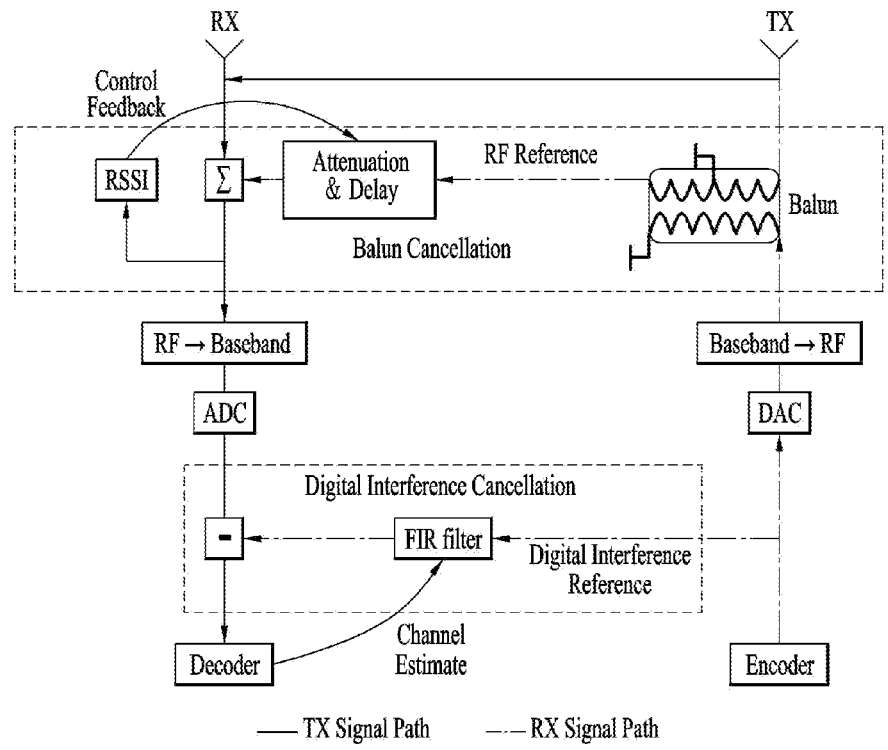
FIG. 9 is a diagram for a method of cancelling analog/digital interference in a FDR system.

FIG. 9 is a diagram for a method of cancelling analog/digital interference in a FDR system.

In addition to the digital cancellation, there exists an area of analog cancellation processed in an RF signal before passing through a DAC or an ADC. As shown in FIG. 9, the analog cancellation indicates that an analog cancellation signal is directly generated by performing digital estimation on self-interference in a second transmit chain and the analog cancellation signal is aggregated at an RX end. By doing so, SIC can be performed. FIG. 9 shows both a transmitting end structure and a receiving end structure in which the analog cancellation and the digital cancellation are implemented at a time. In particular, according to the analog cancellation scheme, a signal itself of the transmitting end is reversed and the reversed signal is combined with a signal of the receiving end. By doing so, the directly received transmission signal can be disappeared.

Figure 10:
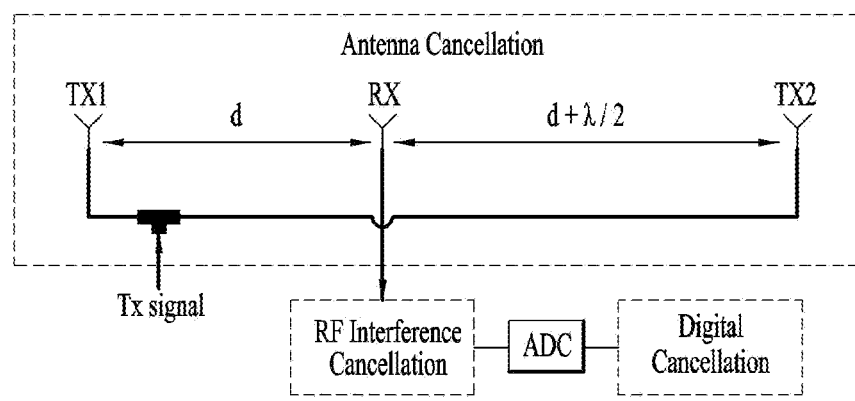
FIG. 10 is a diagram for an example of a scheme of cancelling antenna interference.

FIG. 10 is a diagram for an example of a scheme of cancelling antenna interference.

Lastly, there exists an antenna interference cancellation scheme. In case of a transceiver consisting of 2 Tx antennas and 1 Rx antenna, when signals transmitted from the 2 Tx antennas are received by the Rx antenna, if the signals are implemented to respectively have a reverse phase of 180 degrees, phases of the signals transmitted from the 2 Tx antennas have a difference of 180 degrees, respectively. Hence, an added signal received by a center-positioned Rx antenna becomes Null, i.e., 0. FIG. 10 shows a simple implementation case of the antenna interference cancellation scheme. In this case, a distance between the 2 Tx antennas and the Rx antenna has an exact difference as much as $\lambda/2$. Hence, a phase also has an exact difference of 180 degrees.

In general, since complexity of the antenna interference cancellation scheme is low, it is the easiest way of implementing a cancellation scheme. Yet, as mentioned in the foregoing description, maximum interference cancellation capability of the antenna interference cancellation scheme is known as about 20 to 30 dB. Yet, it is necessary to have SIC capability of about 70 dB for a FDR system. For the SIC capability, it may be able to combine the aforementioned 3 schemes with each other. Yet, there exists a specific communication environment in which capability of the antennal interference cancellation scheme is maximized.

In particular, as system bandwidth is getting smaller or as a center frequency is moving to a high frequency, the capability of the antenna IC is rapidly increasing. Hence, it is able to deduce one insight from the aforementioned phenomenon. If a high frequency narrow band is assigned to a FDR communication area, since it is able to secure sufficient SIC capability using antenna interference cancellation only, it may be able not only to secure performance of FDR but also to lower implementation complexity. In general, since a high frequency transmission band aims at wideband communication using a wide frequency band, if a part of the high frequency transmission band is configured as a FDR zone, it may be able to develop environment advantageous for cancelling self-interference via the antenna IC and deduct sufficient performance.

The present invention proposes a method of cancelling a self-interference signal in case of single channel-full duplex for a FDR system.

Single Channel-Full Duplex Wireless Communication (Single Channel-Full Duplex)

Figure 11:
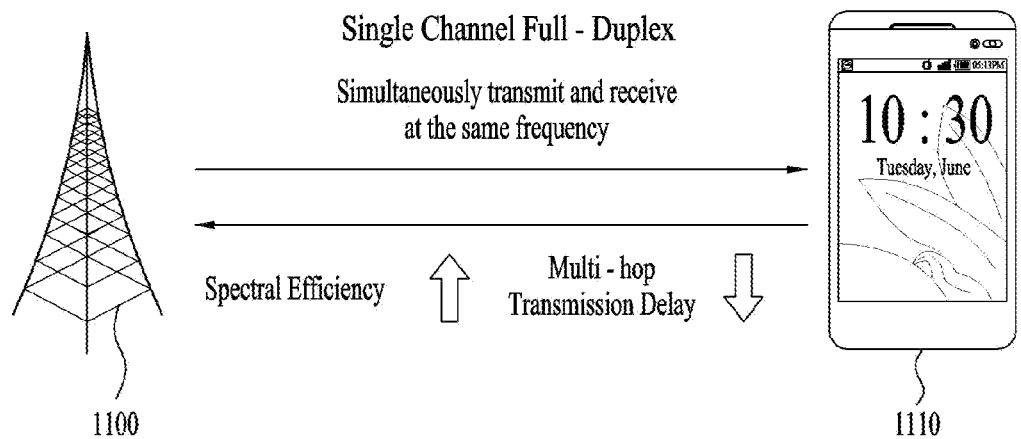
FIG. 11 is a diagram for an example of single channel-full duplex (SC-FD) wireless communication.

FIG. 11 is a diagram for an example of single channel-full duplex (SC-FD) wireless communication.

As shown in FIG. 11, a base station 1100 and a user equipment 1110 can perform full duplex wireless communication via a single channel. The single channel may be comprehended as a single frequency channel and a scheme of the full duplex corresponds to a scheme that a single transceiving entity (base station or user equipment) not only transmits a signal to a counterpart entity but also receives a signal from the counterpart entity. Hence, the single channel-full duplex wireless communication is better in terms of a frequency efficiency (spectral efficiency) compared to a half-duplex scheme and may be able to reduce multi-hop transmission delay.

Figure 12A:
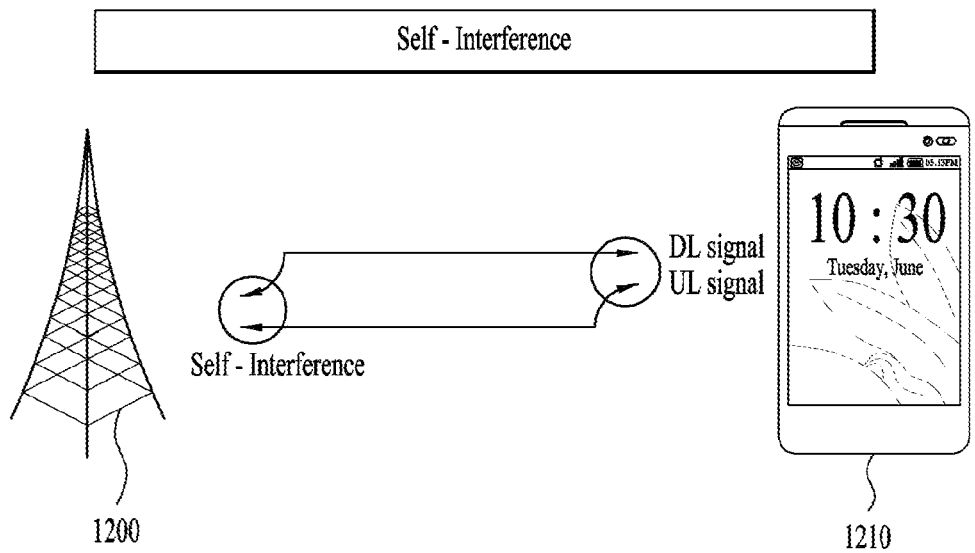
FIGS. 12(a) and 12(b) are conceptual diagrams for a type of interference of a single channel.

FIG. 12 is a conceptual diagram for a type of interference of a single channel.

FIG. 12($a$) shows self-interference of a transceiving entity. A base station transmits a DL signal to a user equipment and the user equipment transmits a UL signal to the base station. In this case, since transmission and reception are performed at the same time in the full-duplex scheme, the base station can receive the DL signal transmitted to the user equipment by the base station and the signal becomes a self-interference signal. Similarly, the user equipment transmits an UL signal to the base station. If the UL signal is received by the user equipment, the UL signal acts as a self-interference signal.

Figure 12B:
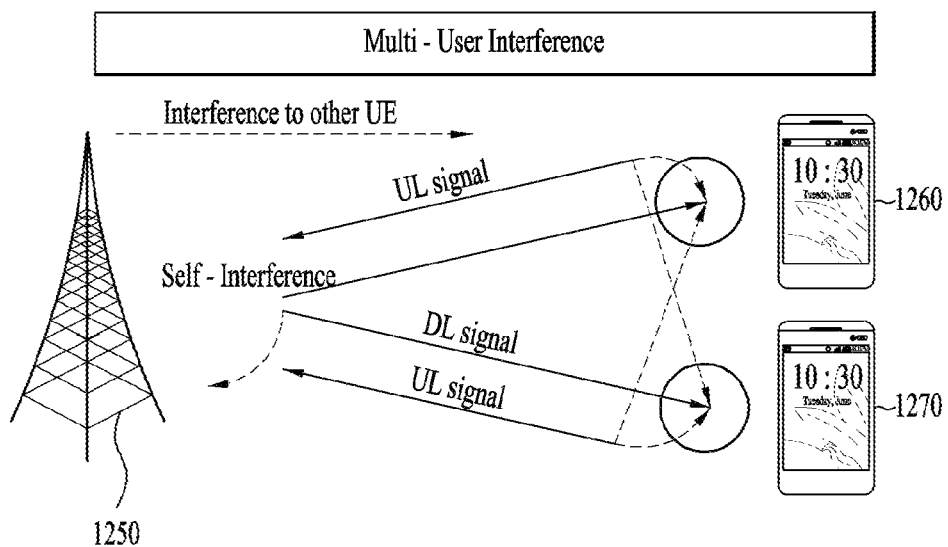

FIG. 12(b) shows self-interference in case of performing communication between a base station and a plurality of user equipments. Similar to FIG. 12(a), the base station and a plurality of the user equipments can transmit/receive a DL/UL signal at the same time. Since the base station communicates with a plurality of the user equipments belonging to coverage of the base station instead of communicating with a single user equipment only, the base station can receive self-interference signals more than the self-interference signal shown in FIG. 12(a).

Moreover, an interference signal can also be generated between user equipments communicating with the base station. When a single user equipment communicating with the base station transmits an UL signal to the base station, a neighboring different user equipment can receive the UL signal and the UL signal may act as an interference signal.

FIG. 13 is a diagram for a form of interference between a base station and a user equipment.

As shown in FIG. 13, a single base station can communicate with a plurality of user equipments. Although a DL signal transmitted by the base station is received by a plurality of the user equipments, the base station is also able to receive the DL signal transmitted to a plurality of the user equipments. Although a user equipment is able to transmit an UL signal to the base station, the user equipment is also able to receive the UL signal transmitted to the base station. And, the user equipment may also be able to receive an UL signal transmitted to the base station by a different user equipment. Since the base station (NB) includes a transceiver, a transmitter of the base station transmits a signal to a user equipment (UE) and a receiver of the base station can receive a signal transmitted by the UE at the same time. Since the UE includes a transceiver as well, a transmitter of the UE transmits a signal to the base station and a receiver of the UE can receive a signal transmitted by the base station at the same time.

Figure 14:
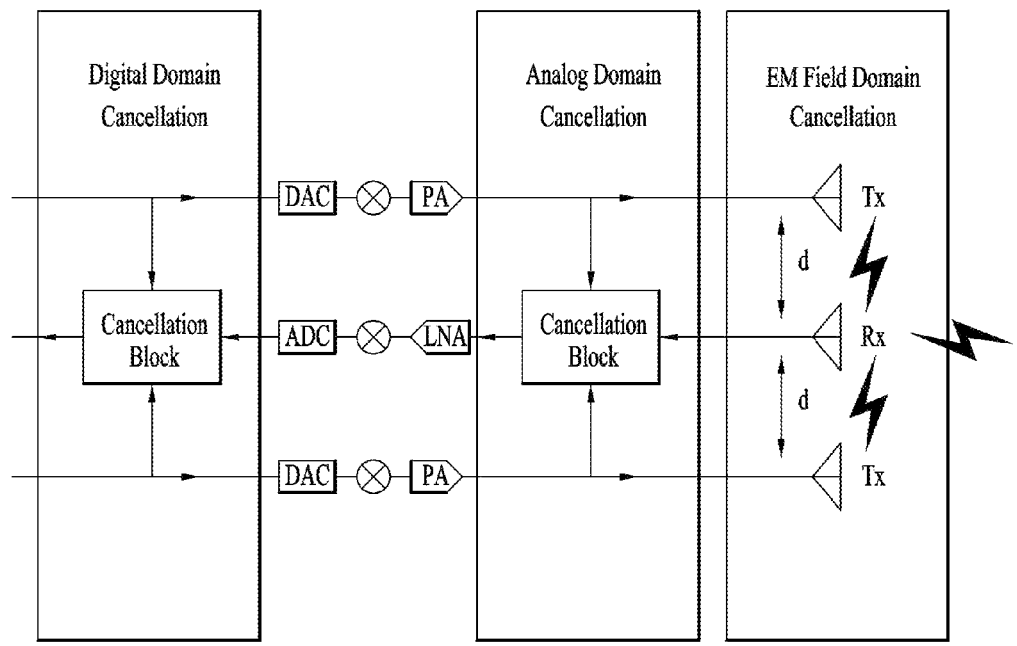
FIG. 14 is a diagram for a structure of a transceiver configured to cancel an interference signal using a legacy technology.

FIG. 14 is a diagram for a structure of a transceiver configured to cancel an interference signal using a legacy technology.

As shown in FIG. 14, cancelling an interference signal can be classified into a digital cancellation area and an analog cancellation area. A signal transmitted via a transmission antenna Tx of a single transceiver entity can be received again by a reception antenna Rx of the transceiver. Since the signal may act as an interference signal to reception of an original desired signal intended to be received by a counterpart transceiver, it is required to have a cancellation process. Although the present invention explains a data signal transmitted by the counterpart transceiver as the desired signal, the desired signal may include a control signal as well. The desired signal may become not only the data signal but also a signal of various forms.

The received desired signal and the interference signal perform analog interference cancellation. As mentioned in the foregoing description, an interference cancellation scheme is classified into digital interference cancellation and analog interference cancellation. The interference signal is primarily cancelled via a cancellation block in an analog domain and the cancelled signal may be able to lower overall noise of a receiver by passing through an LNA (low noise amplifier). The signal underwent the LNA is converted into a digital signal by passing through an ADC converter.

The interference signal is secondly cancelled from the signal converted into the digital signal via a cancellation block of a digital domain and the digital signal is inputted as a reception signal of a transceiver. The digital signal from which interference is cancelled is converted into an analog signal again by passing through a DAC converter, is amplified by passing through a power amplifier and can be used to cancel interference in the analog domain.

In the aforementioned interference cancellation scheme, since a base station is hard to measure a self-interference due to an UL signal and is unable to precisely measure the self-interference signal, it is difficult for the base station to properly cancel the self-interference signal. In addition, it may also be difficult for the base station to measure an uplink synchronization signal due to the self-interference signal.

In terms of a user equipment, since multi-user interference may increase due to an UL signal transmitted by a neighboring user equipment adjacent to the user equipment, a self-interference signal and a multi-user interference signal may make difficult for the user equipment to obtain a downlink synchronization signal and a system signal.

Hence, in order to solve the aforementioned problems, the present invention proposes a method of more precisely performing interference cancelling in an analog domain and a digital domain in an interference cancelling process.

EMBODIMENT 1

Cancelling Self-Interference Signal

Figure 15:
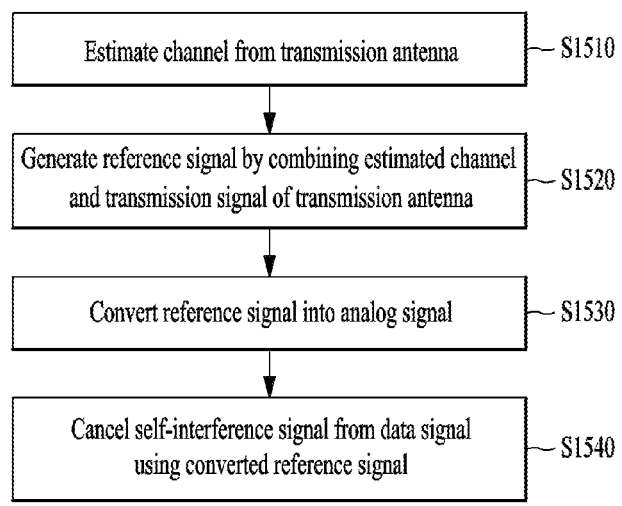
FIG. 15 is a flowchart for an example of an interference cancellation process according to the present invention.

FIG. 15 is a flowchart for an example of an interference cancellation process according to the present invention.

First of all, a channel is estimated from a transmitting antenna of a transceiver [S1510]. Since the transceiver is able to precisely know a signal transmitted by the transceiver (since the signal is transmitted by the transceiver), if the signal transmitted by the transceiver is received again (self-interference), the transceiver is able to know a difference of the signal. The transceiver generates a reference signal by combining the estimated channel and the signal transmitted by the transmitting antenna [S1520], and may be able to convert the generated reference signal into an analog signal [S1530].

The transceiver can receive a data signal transmitted by a counterpart transceiver as well as a self-interference signal using a receiving antenna of the transceiver. The transceiver can efficiently cancel the self-interference signal from the received data signal using the converted reference signal by passing through a process of cancelling the self-interference signal [S1540].

In this case, an organic interference cancelling process can be performed by performing channel estimation and signal synthesis in a digital domain and performing cancelling of the self-interference signal in an analog domain.

Figure 16:
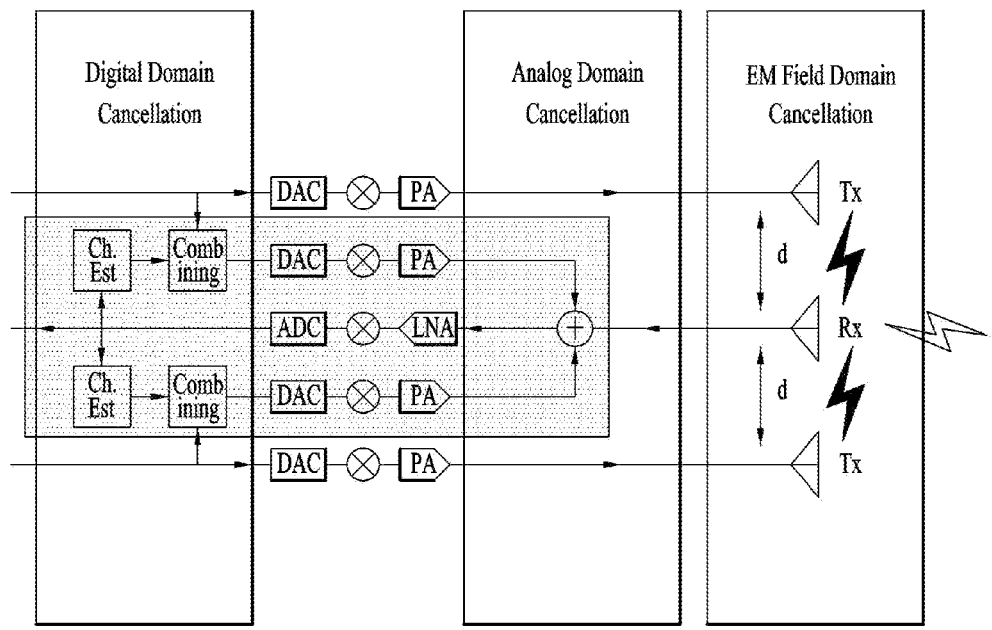
FIG. 16 is a diagram for an example of a transceiver configured to perform an interference cancellation process according to the present invention.

FIG. 16 is a diagram for an example of a transceiver configured to perform an interference cancellation process according to the present invention.

As shown in FIG. 16, interference cancellation can be classified into interference cancellation in a digital domain, interference cancellation in an analog domain and interference cancellation in an EM (electro-magnetic) field domain.

A transmitting antenna Tx of an EM field transmits a signal transmitted by a transceiver and the signal can be received together with a desired signal received by a receiving antenna Rx. In order to cancel a self-interference signal from the desired signal with which the self-interference signal is combined, the transceiver can perform a series of processes. As mentioned earlier in FIG. 10, a series of the processes can be mainly divided into 4 steps. It needs to pay attention to whether a domain in which each step is performed corresponds to a digital domain or an analog domain.

For clarity, interference cancellation in a digital domain is explained first. In the digital domain, it is able to know a reception signal in which a desired signal and a self-interference signal are combined. In this case, the transceiver can estimate a channel of the reception signal between a base station and a user equipment via the reception signal. The estimated channel is used for identifying the extent of distortion of the reception signal and the extent of distortion can be identified by measuring a size and the like of the reception signal. In case of multiple antennas such as MIMO and the like, since it is more difficult to precisely estimate a channel due to delay and the like compared to a single path, it is able to precisely receive a desired signal only when the extent of distortion of the desired signal is identified by a channel estimation process. Since the transceiver knows a signal transmitted by the transceiver, the transceiver is able to know a self-interference signal among a reception signal. As a method of cancelling the self-interference signal, the transceiver can obtain the desired signal.

Having completed the channel estimation, the transceiver can combine the estimated channel and a transmission signal to be transmitted in a transmitting antenna to obtain the desired signal from the reception signal. In other word, a distorted transmission signal is generated to cancel the self-interference signal and the distorted transmission signal can be considered as a reference signal. The transceiver can combine a transmission signal and a channel estimated from a reception signal of a receiving end with each other according to each transmitting antenna.

A reference signal, which is generated by combining an estimated channel and a transmission signal, is compared or combined with a reception signal received by the transceiver to cancel a self-interference signal. In this case, whether the combination with the reception signal is performed in a digital domain or an analog domain can be an important condition.

First of all, a case of performing combination between a reference signal and a reception signal in an analog domain is explained. In order to perform the combination in the analog domain, the aforementioned reference signal generated in the digital domain should be converted into an analog signal. Hence, the reference signal can be converted into an analog signal using a DAC converter.

A desired signal can be obtained from a reception signal using a reference signal configured to cancel a self-interference signal. Although the present invention explains the desired signal as a data signal, the desired signal can include a control signal as well. It needs to pay attention to a point that the desired signal corresponds to a data signal of a broad sense indicating a signal of various forms. For instance, a reference signal may be different from a reception signal in a manner that a phase of the reference signal is different from a phase of the reception signal as much as 180 degrees. In other word, if 180 degree-reverse phase is implemented, a difference between the two signals becomes 180 degrees.

Hence, if a signal is generated by combining the reference signal and the reception signal, the signal may become an original desired signal.

A domain in which the aforementioned two signals are combined is more explained. If the two signals are combined in an analog domain, a burden of a transceiver for a desired signal can be reduced. An obtained desired signal is inputted as the desired signal by passing through a LNA (low noise amplifier), since the desired signal is obtained in the analog domain, a range of signal strength is constant compared to a reception signal in which a self-interference signal is included. If the self-reference signal is included, since a variable range of the signal strength is big, a signal is passing through the LNA with unstable strength and it may be a burden to the transceiver.

The desired signal, which has passed through the LNA, is converted into a digital signal by passing through an ADC converter and the converted desired signal is inputted as a final reception signal of the transceiver. If this loop is repeatedly performed, it may be able to avoid (symbol) interference between the self-interference signal and the desired signal (data signal) and may be able to aim at stabilization of the LNA.

Figure 17:
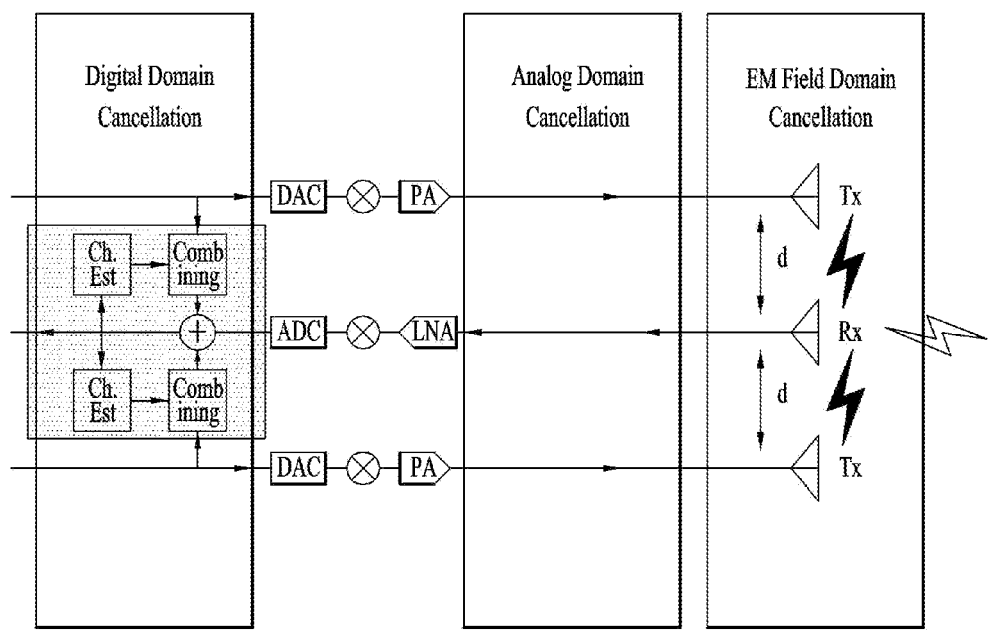
FIG. 17 is a diagram for a different example of a transceiver configured to perform an interference cancellation process according to the present invention.

FIG. 17 is a diagram for a different example of a transceiver configured to perform an interference cancellation process according to the present invention.

As shown in FIG. 17, what is different between FIG. 16 and FIG. 17 is to perform all processes in a digital domain.

Similar to the aforementioned interference cancellation process, interference cancellation in a digital domain is explained first. In the digital domain, it is able to know a reception signal in which a desired signal and a self-interference signal are combined. In this case, the transceiver can estimate a channel of the reception signal between a base station and a user equipment via the reception signal. The estimated channel is used for identifying the extent of distortion of the reception signal and the extent of distortion can be identified by measuring a size and the like of the reception signal. In case of multiple antennas such as MIMO and the like, since it is more difficult to precisely estimate a channel due to delay and the like compared to a single path, it is able to precisely receive a desired signal only when the extent of distortion of the desired signal is identified by a channel estimation process. Since the transceiver knows a signal transmitted by the transceiver, the transceiver is able to know a self-interference signal among a reception signal. As a method of cancelling the self-interference signal, the transceiver can obtain the desired signal.

Having completed the channel estimation, the transceiver can combine the estimated channel and a transmission signal to be transmitted in a transmitting antenna to obtain the desired signal from the reception signal. In other word, a distorted transmission signal is generated to cancel the self-interference signal and the distorted transmission signal can be considered as a reference signal. The transceiver can combine a transmission signal and a channel estimated from a reception signal of a receiving end with each other according to each transmitting antenna.

Referring to FIG. 17, it shows a process of cancelling an interference signal from a signal received by a reception antenna in the digital domain even after the transmission signal and the estimated channel are combined. Since channel estimation, signal combining and interference cancellation are all performed in the digital domain, a burden for signal processing can be reduced due to calculation amount reduction and the like.

Since a reference signal is generated by combining a transmission signal to be transmitted by a transmitting antenna and an estimated channel, a self-interference signal can be cancelled by comparing (combining) the reference signal and a reception signal. First of all, it is necessary to briefly explain the reception signal. The reception signal received in a receiving antenna of the transceiver can include not only a desired signal (data signal) but also a self-interference signal. Unlike the reception signal mentioned earlier in FIG. 11, the reception signal is inputted to the LNE to reduce noise and is converted into a digital signal by passing through the ADC converter. Hence, the converted reception signal can continuously include the self-interference signal.

It is able to obtain an originally designed desired signal by comparing or combining the converted reception signal and the previously generated reference signal. For instance, the reference signal and the reception signal can cancel an interference signal using various schemes such as beamforming and the like. If a self-interference signal is cancelled in the digital domain, a burden for converting a signal to the analog domain can be reduced in terms of the transceiver and signal processing amount can also be reduced.

EMBODIMENT 2

Self-Interference Measurement and Synchronization

Unlike the aforementioned structure of the transceiver configured to cancel a self-interference signal, a method of measuring a self-interference signal by changing a method of transceiving a signal between a base station and a user equipment is explained in the following.

Figure 18:
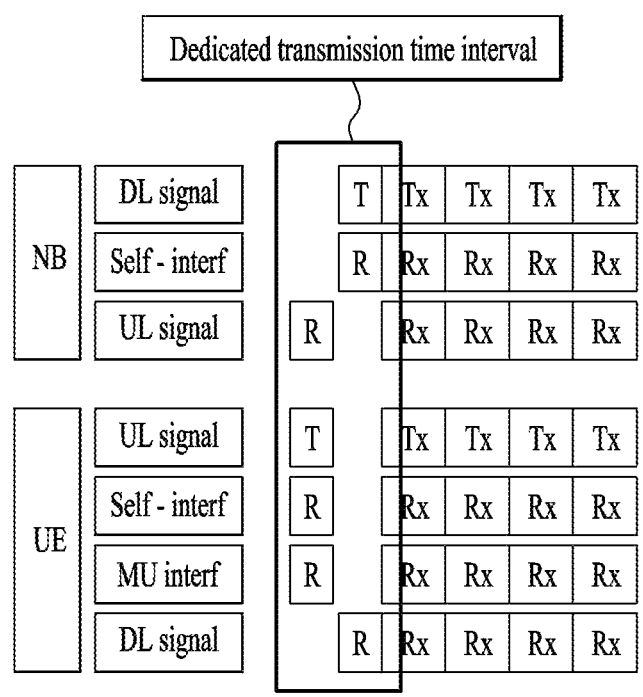
FIG. 18 is a diagram for an example of a duplexing method between a base station and a user equipment.

FIG. 18 is a diagram for an example of a duplexing method between a base station and a user equipment.

As shown in FIG. 18, a base station (NB) and a user equipment (UE) can transceive a signal with each other. A signal transmitted to the UE by the NB is called a downlink (DL) signal and a signal transmitted to the NB by the UE is called an uplink (UL) signal. As mentioned in the foregoing description, if a DL signal transmitted by the NB/UE is received again by the NB/UE, the signal is called a self-interference signal. If a UL signal transmitted by the UE is received by a different UE, the signal is called a multi user (MU) interference signal.

As a method for a base station to transceive a signal to measure a self-interference signal, the base station can transmit a DL signal to a UE or receive an UL signal from the UE. In this case, time interval of the DL signal transmission and time interval of the UL signal transmission can include dedicated transmission time interval. Signal transmission time interval of the base station and signal transmission time interval of the UE are distinguished from each other in the dedicated transmission time interval. In other word, the UE does not transmit an UL signal during time interval in which the base station transmits a DL signal and the base station does not transmit a DL signal during time interval in which the UE transmits an UL signal. A full-duplex scheme can be applied again after the dedicated transmission time interval. This scheme corresponds to a method of allocating both a base station-dedicated time interval and a UE-dedicated time interval to a dedicated transmission time interval. By using the scheme, it is more easy to obtain synchronization information by differentiating transmission time of the base station from transmission time of the UE.

Figure 19:
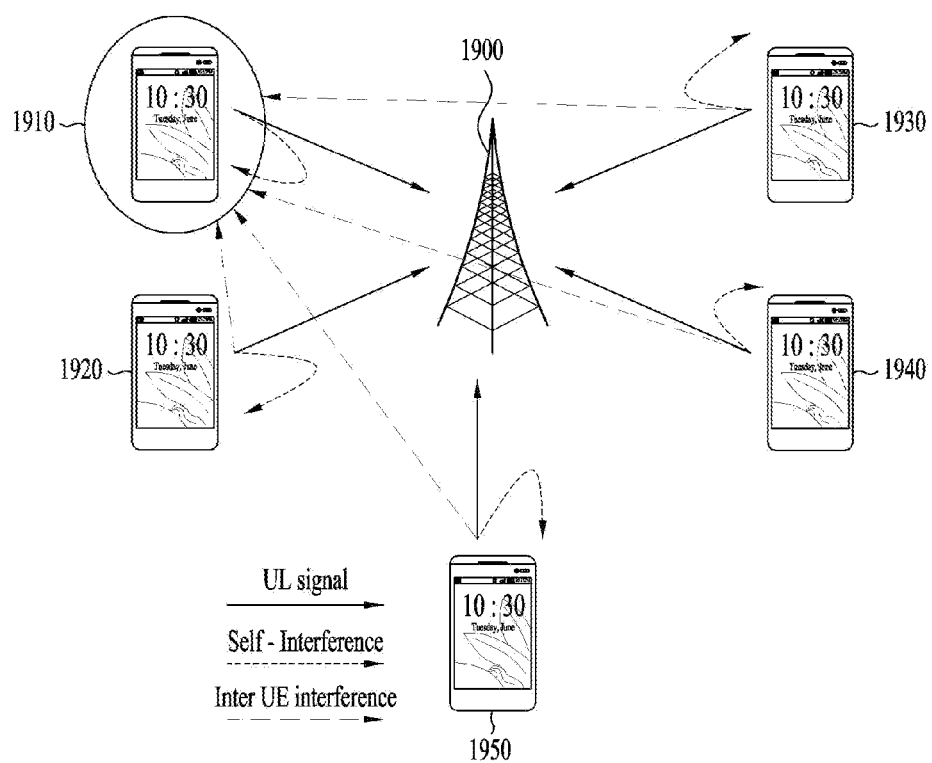
FIG. 19 is a diagram for a user equipment transmitting an uplink signal according to one embodiment of the present invention.

FIG. 19 is a diagram for a user equipment transmitting an uplink signal according to one embodiment of the present invention.

Figure 20:
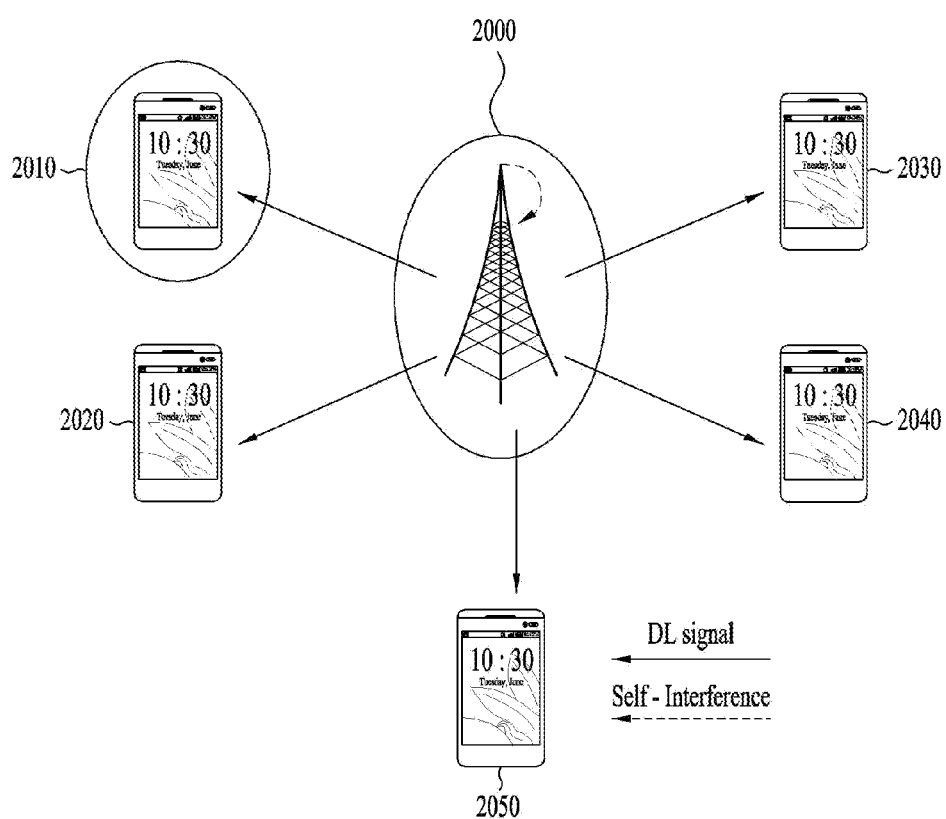
FIG. 20 is a diagram for a base station transmitting a downlink signal according to one embodiment of the present invention.

FIG. 20 is a diagram for a base station transmitting a downlink signal according to one embodiment of the present invention.

Referring to FIGS. 18 to 20, first of all, a user equipment transmits an uplink (UL) signal to a base station. In this case, the base station receives the UL signal without transmitting a downlink (DL) signal to the user equipment. The user equipment transmitting the UL signal to the base station can receive the signal (self-interference signal) transmitted by the user equipment. And, since a dedicated transmission interval distinguishes a time interval for which the base station transmits a signal and a time interval for which the user equipment transmit a signal from each other, a plurality of user equipments can transmit an UL signal to the base station at the same time. In this case, an UL signal (MU signal) of a different user equipment rather than the user equipment can be received by the user equipment.

On the contrary, the base station can solely transmit a DL signal in a dedicated transmission interval of the base station and the user equipment can receive the DL signal transmitted by the base station. The base station can also receive the DL signal transmitted by the base station as a self-interference signal.

A half-duplex scheme can be applied to a full-duplex scheme by allocating a dedicated transmission time interval to the base station and the user equipment. In other word, referring to FIGS. 18 to 20, the base station performs reception only in a time interval for which the user equipment is able to perform transmission and reception at the same time. The user equipment performs reception only in a time interval for which the base station is able to perform transmission and reception at the same time. Hence, the base station can measure a signal transmitted by the base station as a self-interference signal by allocating the dedicated transmission time interval. Similarly, the user equipment can measure a signal transmitted by the user equipment as a self-interference signal by allocating the dedicated transmission time interval. Hence, the base station and the user equipment can more efficiently estimate a channel state of the user equipment by receiving (measuring) a signal transmitted by the base station/the user equipment again. Yet, there is a problem incapable of being solved. Although the dedicated transmission time interval of the base station and the dedicated transmission time interval of the user equipment are distinguished from each other, since dedicated transmission time intervals between user equipments are not distinguished from each other, it is difficult to measure multi user (MU) interference signal.

Figure 21:
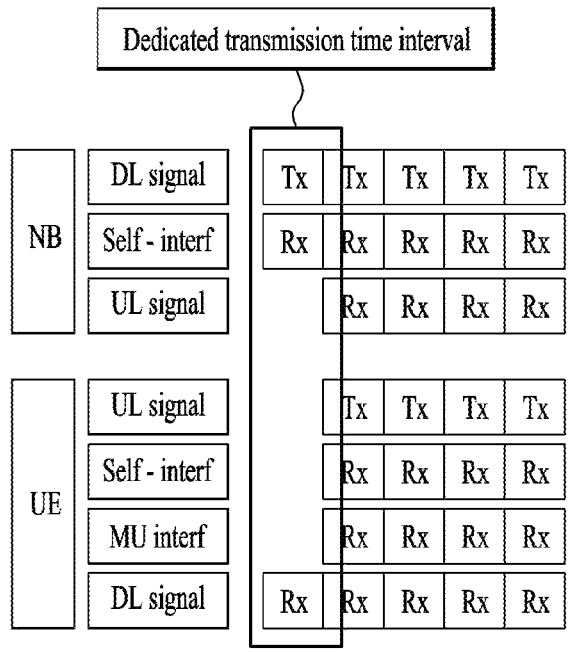
FIGS. 21 and 22 are diagrams for a different example of a duplexing method between a base station and a user equipment.
Figure 22:
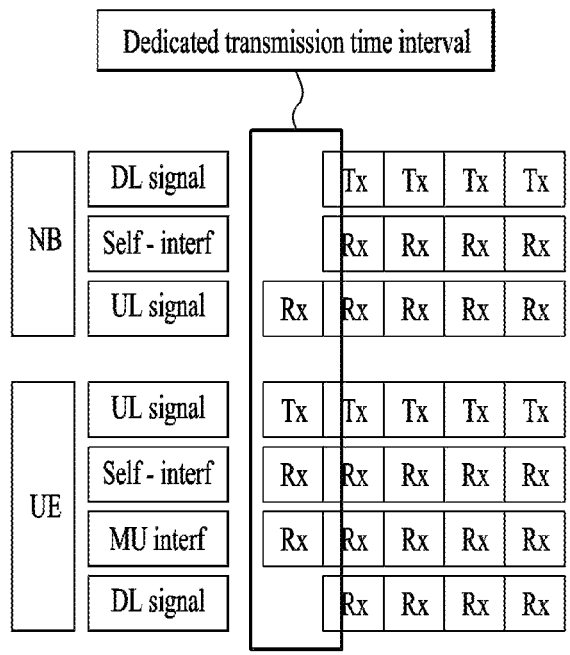

FIGS. 21 and 22 are diagrams for a different example of a duplexing method between a base station and a user equipment.

As shown in FIGS. 21 and 22, a base station and a user equipment may have a base station-dedicated transmission time interval or a user equipment-dedicated transmission time interval in a dedicated transmission time interval without having a respective dedicated transmission time interval. Yet, since either the base station or the user equipment transmits a signal in the dedicated transmission time interval, measurement of a self-interference signal can be more accurate and it is also profitable for obtaining a synchronization signal. Yet, it should be considered that frequency efficiency is lower than the scheme mentioned earlier in FIG. 13.

Figure 23:
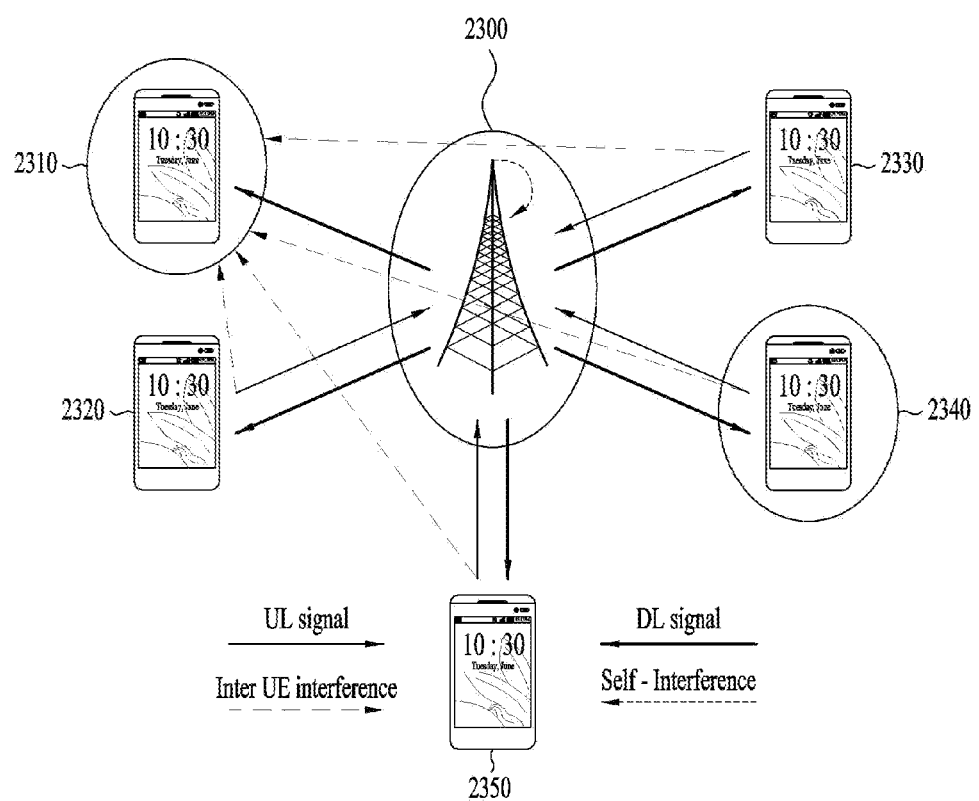
FIG. 23 is a diagram for a process of transceiving a signal with a plurality of user equipments by a base station according to one embodiment of the present invention.

FIG. 23 is a diagram for a process of transceiving a signal with a plurality of user equipments by a base station according to one embodiment of the present invention.

As shown in FIG. 23, a base station can transceive a signal with a plurality of user equipments positioned within a cell. Since the base station covers a relatively wider range compared to a user equipment, the base station can transmit a downlink signal to a plurality of the user equipments and a plurality of the user equipments positioned within the cell of the base station can transmit an uplink signal to the base station in charge of the cell. In this case, as mentioned in the foregoing description, a self-interference signal and a multi-user (MU) interference signal may occur. Hence, it is required to have a method of cancelling the self-interference signal and the multi-user (MU) interference signal.

Figure 24:
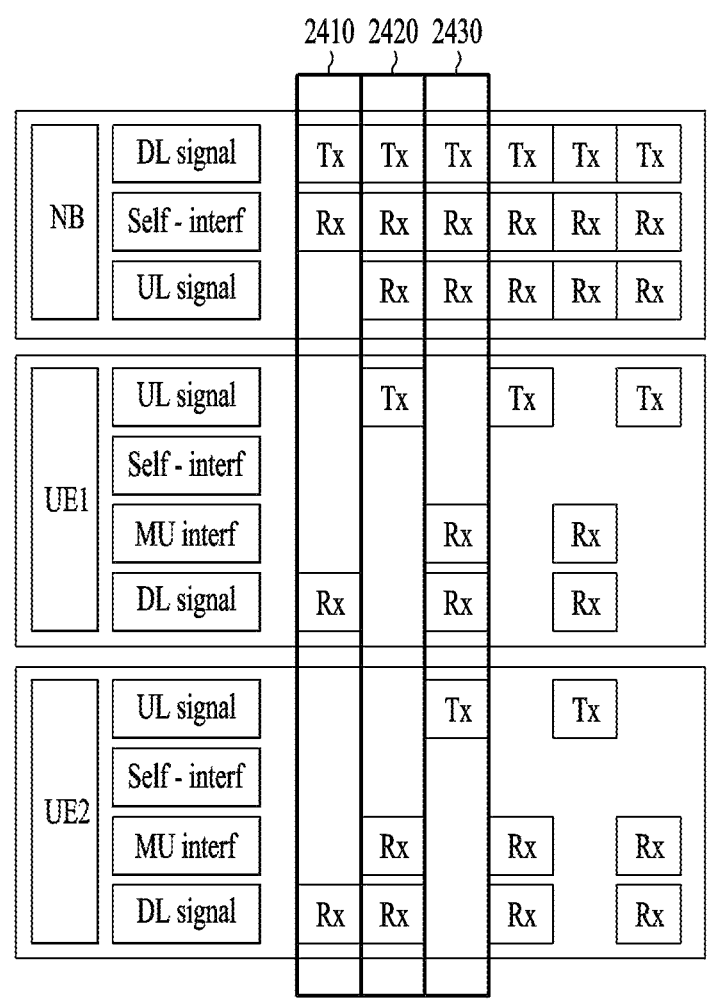
FIG. 24 is a diagram for a further different example of a duplexing method between a base station and a user equipment according to one embodiment of the present invention.

FIG. 24 is a diagram for a further different example of a duplexing method between a base station and a user equipment according to one embodiment of the present invention.

As shown in FIG. 24, it is able to know that there exist a dedicated transmission time interval of a base station and a dedicated transmission time interval of a user equipment. In the present invention, for clarity, assume that there is one base station (NB) and two user equipments (UE1 and UE2). First of all, it is able to know that the base station adopts a full-duplex scheme capable of transmitting and receiving a signal all the time. Hence, the base station can receive an uplink signal transmitted by the user equipment while transmitting a downlink signal to the user equipment.

A user equipment 1 (UE1) can be configured not to transmit a signal during a time interval 2410 for which the base station transmits a downlink signal. The UE1 receives the downlink signal transmitted by the base station only during the base station-dedicated transmission time interval.

When the dedicated transmission time interval 2410 of the base station elapses, it may be able to assign a dedicated transmission time interval 2420 of the UE1. During this interval, the UE1 can be configured to perform uplink transmission only. In particular, the UE1 can be configured not to receive a signal. In this case, since the UE1 receives no signal, the UE1 does not receive an uplink signal transmitted by the UE1 as a self-interference signal. The base station can receive the uplink signal transmitted by the UE1 in the dedicated transmission time interval of the UE1 and may be able to transmit a downlink signal of the base station in the dedicated transmission time interval of the UE1. Hence, in terms of the base station, the downlink signal transmitted by the base station can be received by the base station as a self-interference signal. Since a different user equipment (UE2) communicating with the base station is configured to perform reception only without performing transmission (since it is the dedicated transmission time interval of the UE1), the UE2 can receive the downlink signal of the base station and may be able to receive a signal transmitted by the UE 1 as a multi user (MU) interference signal.

When the dedicated transmission time interval 2410 of the UE1 elapses, it may be able to assign a dedicated transmission time interval 2430 of the UE2. During this interval, the UE2 transmits an uplink signal and receives no signal. Similar to the aforementioned dedicated transmission interval of the UE1, since the UE2 receives no signal, the UE2 does not receive an uplink signal transmitted by the UE2 as a self-interference signal. The base station can receive the uplink signal transmitted by the UE2 in the dedicated transmission time interval of the UE2 and may be able to transmit a downlink signal of the base station in the dedicated transmission time interval of the UE2. Hence, in terms of the base station, the downlink signal transmitted by the base station can be received by the base station as a self-interference signal. Since a different user equipment (UE1) communicating with the base station is configured to perform reception only without performing transmission (since it is the dedicated transmission time interval of the UE2), the UE1 can receive the downlink signal of the base station and may be able to receive a signal transmitted by the UE2 as a multi user (MU) interference signal.

As mentioned in the foregoing description, cancellation and measurement of a self-interference signal of the present invention can be implemented by independently applying items described in various embodiments of the present invention or applying two or more embodiments at the same time. For clarity, explanation on overlapped contents is omitted at this time.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the present invention is explained centering on a form applied to a wireless communication system in the foregoing description, the present invention can be used for various mobile communication systems between a base station and a user equipment using an identical or an equivalent principle.

The invention claimed is:

1. A method for transmitting and receiving a signal by a base station in a wireless communication system, the method comprising:
  receiving a downlink signal transmitted from the base station without receiving an uplink signal from a user equipment during a dedicated transmission time interval; wherein the dedicated transmission time interval includes a transmission time interval for the downlink signal and a transmission time interval for the uplink signal;
  estimating a self-interference channel based on the received downlink signal;

receiving a self-interference signal and the uplink signal after the dedicated transmission time interval; and cancelling the self-interference signal based on the estimated self-interference channel.

2. The method according to claim 1, wherein transmitting the downlink signal and receiving the uplink signal are performed simultaneously after the dedicated transmission time interval.

3. The method according to claim 1, further comprising:
wherein the transmission time interval for the downlink signal and the transmission time interval for the uplink signal are distinguished from each other in the dedicated transmission time interval.

4. The method according to claim 1, wherein receiving the downlink signal for estimating the self-interference channel is performed during the transmission time interval for the downlink signal in the dedicated transmission time interval.

5. The method according to claim 1,
wherein the self-interference signal corresponds to the downlink signal transmitted from the base station after the dedicated transmission time interval and the self-interference signal and the uplink signal are simultaneously received by the base station.

6. The method according to claim 1, further comprising:
wherein the transmission time interval for the uplink signal is configured for each of a plurality of user equipment located in a cell of the base station.

7. The method according to claim 1, wherein the transmission of the uplink signal and the downlink signal are performed in a same frequency band.

8. The method according to claim 1, wherein a subframe involved in transmitting the downlink signal from the base station to the user equipment comprises at least one of a physical broadcast channel (PBCH), a primary synchronization signal/secondary synchronization signal (PSS/SSS), a reference signal and data channel information.

9. The method according to claim 1, wherein a subframe involved in transmitting the uplink signal from the user equipment to the base station comprises at least one of a physical random access channel (PRACH), a sounding reference signal (SRS), a physical uplink control channel (PUCCH) and physical uplink shared channel (PUSCH) information.

10. The method according to claim 1, wherein the self-interference signal is the downlink signal received by the base station after being transmitted from the base station.

11. The method according to claim 1, further comprising:
acquiring downlink synchronization information based on the downlink signal or the uplink signal.

12. A method for transmitting and receiving a signal by a base station in a wireless communication system, the method comprising:

receiving a downlink signal transmitted from the base station without receiving an uplink signal from a user equipment during a dedicated transmission time interval; wherein the dedicated transmission time interval includes a transmission time interval for the downlink signal and a transmission time interval for the uplink signal;

estimating a self-interference channel based on the received downlink signal;

receiving a self-interference signal and an uplink signal from each of a plurality of user equipment after the dedicated transmission time interval; and cancelling the self-interference signal based on the estimated self-interference channel, wherein, when a first user equipment of the plurality of user equipment transmits an uplink signal in a time interval, none of the other user equipment of the plurality of equipment transmits an uplink signal in the time interval.

13. The method according to claim 12, wherein the uplink signal transmitted by the first user equipment is received by at least one of the other user equipment of the plurality of user equipment.

14. The method according to claim 12, wherein the base station performs the transmitting and the receiving in the time interval.

15. A base station for transmitting and receiving a signal in a wireless communication system, comprising:
a transceiver; and
a processor that:
controls the transceiver to receive a downlink signal transmitted from the base station without receiving an uplink signal from a user equipment during a dedicated transmission time interval, wherein the dedicated transmission time interval includes a transmission time interval for the downlink signal and a transmission time interval for the uplink signal;
estimates a self-interference channel based on the received downlink signal,
controls the transceiver to receive a self-interference signal and the uplink signal after the dedicated transmission time interval, and
cancels the self-interference signal based on the estimated self-interference channel.

* * * * *